United States Patent [19]

Shinohara

[11] Patent Number: 5,681,001
[45] Date of Patent: Oct. 28, 1997

[54] SPINNING REEL FOR FISHING WITH IMPROVED FISHLINE GUIDING APPARATUS

[75] Inventor: Eiji Shinohara, Tokyo, Japan

[73] Assignee: Daiwa Seiko, Inc., Tokyo, Japan

[21] Appl. No.: 628,818

[22] Filed: Apr. 5, 1996

[30] Foreign Application Priority Data

Apr. 6, 1995 [JP] Japan .................... 7-139843

[51] Int. Cl.$^6$ .................................................. A01K 89/01
[52] U.S. Cl. ........................... 242/231; 242/230
[58] Field of Search .................... 242/230, 231, 242/232, 233

[56] References Cited

U.S. PATENT DOCUMENTS

| 2,728,534 | 12/1955 | Wallace | 242/231 |
| 2,836,375 | 5/1958 | Meulnart | 242/231 |
| 5,261,627 | 11/1993 | Shinohara | 242/231 |

FOREIGN PATENT DOCUMENTS

| 0696423 | 2/1996 | European Pat. Off. |
| 3-17661 | 4/1991 | Japan . |
| 8000136 | 1/1996 | Japan . |
| 8023835 | 1/1996 | Japan . |

*Primary Examiner*—Katherine Matecki
*Attorney, Agent, or Firm*—Sughrue, Mion, Zinn, Macpeak & Seas, PLLC

[57] ABSTRACT

A spinning reel for fishing with an improved apparatus for guiding a fishline to a spool, such that when a rotor 2 and bail support members A, B are rotated in the direction in which the fishline is wound up, a fishline 13 is guided by a fishline guide roller 5 and the tilted face 7d of an annular guide portion 7 or the tilted face 9d of an annular guide portion 9, or the tilted faces 7d, 9d of both annular guide portions 7 and 9 before being wound onto a spool 3. While the fishline guide roller 5 is rotated because of the tension in the fishline 13, it is then forced to shift in a direction opposite to a line slider 6. The guiding action of the tilted faces 7d, 9d of the annular guide portions 7, 9 further causes the fishline 13 to be wound on the spool 3 to become twisted in a direction opposite to the direction in which the fishline is played out, without being affected by the fishline winding diameter.

19 Claims, 8 Drawing Sheets

SPINNING REEL FOR FISHING WITH IMPROVED FISHLINE GUIDING APPARATUS

FIELD OF THE INVENTION

The present invention relates to a spinning reel for fishing with an improved apparatus for guiding a fishline to a spool.

DESCRIPTION OF THE RELATED ART

In a typical conventional spinning reel for fishing, a fishline is wound onto a spool by rotating a rotor having a bail and a fishline guide portion.

When a fishline is wound onto a spool via the fishline guide portion of a rotor rotating on the outer side of the spool, the fishline is twisted before being wound onto the spool. In theory, the accumulated twisting of the fishline is loosened and cancelled by playing out the fishline spirally after a bail is raised. However, in practice, as the fishline is repeatedly played-out and wound up, the twisting of the fishline produced during the playing-out operation is not satisfactorily cancelled out when the fishline is wound up. This is due to various factors including the tensile strength of the fishline, the frictional resistance between a fishline guide roller and the fishline (which carries seawater, sand and rubbish), the configuration of the fishline guide roller, the kind and thickness of the fishline and so forth. Therefore, the twisting thus accumulated can result in entanglement of the fishline and severance of the fishline.

A known arrangement for obviating the foregoing disadvantages, as disclosed in Japanese Utility Model Publication No. 17661/1991, is to attach to a fishline guide roller arm (4) a projected control member (6) for pulling a fishline from the center of a drum-like fishline guide roller (5) toward a spool (3) so as to cancel the twisting of the fishline by producing twisting in an offset direction; that is, in a direction opposite to the direction in which the fishline is played out, without causing twisting in the same direction as the direction in which the fishline is played out.

However, the winding diameter of the fishline onto the spool decreases or increases depending on the quantity of played-out fishline or the number of turns of the fishline. Referring now to FIG. 11, when the winding diameter of the fishline 13 onto the spool 3' increases, the fishline 13, guided under the control of a control unit (such as the projected control member (6)), moves to the opposite side of a bail; that is, to the left, on the surface of a drum-like fishline guide roller 5' before being guided to the spool side, whereby twisting is produced in the same direction as the direction in which the fishline 13 is played out. In practice, the twisting produced during the playing-out operation therefore remains uncancelled during the winding operation and the problem is not only that twisting is conversely produced and accumulated under the influence of the aforementioned winding diameter of the fishline onto the spool 3; but also that the fishline 13 tends to become entangled in the projecting control member (6) formed on a fishline guide roller arm (4).

Even if the aforementioned disadvantage is remedied, the use of the drum-like fishline guide rollers 5' allows the fishline 13 to move to the opposite side of the bail via the fishline guide rollers 5' and to be guided toward the spool 3' as the winding diameter of the fishline 13 onto the spool 3' increases. As twisting is produced in the same direction as the direction in which the fishline 13 is played out, the twisting produced during the winding operation remains uncancelled during the playing-out operation. The drawback to this type of reel is that twisting is conversely produced and accumulated depending on the winding diameter of the fishline onto the spool.

SUMMARY OF THE INVENTION

In view of the foregoing disadvantages, an object of the present invention is to provide a spinning reel for fishing capable of twisting a fishline during the winding operation in a direction such that twisting of the fishline during the playing-out operation is cancelled, without being affected by variation in the winding diameter of the fishline onto a spool, thus reducing the twisting of the fishline and the accumulation of the twisting thereof as much as possible and preventing the fishline from becoming entangled or severed.

In order to accomplish the object above, a spinning reel for fishing according to the present invention comprises a support member, having a rotatable fishline guide roller for guiding a fishline to a spool, in the leading end portion of the support arm of a rotor whose rotation is interlocked with that of a handle, wherein an annular guide portion having a tilted face for guiding the fishline to the spool, along with the fishline guide roller, is provided outside the outer periphery of the fishline guide roller, the tilted face being formed in the end portion of the annular guide portion, and wherein the tilted face is oriented to contiguously guide the fishline, during the fishline winding operation, such that the fishline arrives at a first position of the fishline guide roller and departs from a second position of the fishline guide roller, the first position being downstream relative to the second position with respect to the rotational direction in which the rotor is driven to wind the fishline.

The support member comprises a rocking arm fitted to the support arm of the rotor and a line slider for supporting the fishline guide roller with the rocking arm, the rocking arm being provided with the annular guide portion.

Alternatively, the support member may comprise the rocking arm fitted to the support arm of the rotor and the line slider for supporting the fishline guide roller with the rocking arm, the line slider being provided with the annular guide portion.

Alternatively, the support member may comprise the rocking arm fitted to the support arm of the rotor and the line slider for supporting the fishline guide roller with the rocking arm, wherein the rocking arm and the line slider are each provided with annular guide portions whose tilted faces are situated opposite to each other so that the space therebetween is set wider than the thickness of a fishline for use.

DETAILED DESCRIPTION OF THE PREFERRED EMBODIMENTS

A description will now be given of several preferred embodiments of the present invention by reference to the accompanying drawings.

FIGS. 1 through 4 refer to a first embodiment of the invention. As shown in FIGS. 1A and 2A, a rotor 2 is anchored to a cylindrical rotary shaft (not shown) on the front of a reel body 1, and a spool 3 is fitted to a spool shaft (not shown) on the forward side of the rotor 2.

The rotor 2 is rotated via a driving mechanism when a handle 10 is turned, whereas the spool 3 is reciprocated back and forth via an oscillating mechanism when the handle 10 is turned.

Figure 1A:
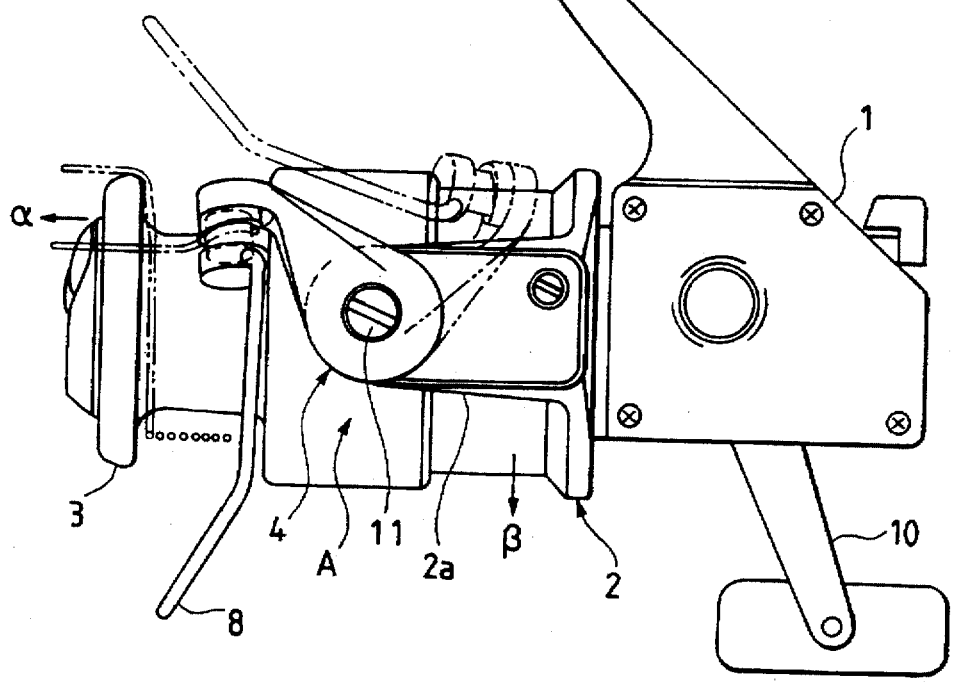
FIG. 1A is a side view of a spinning reel for fishing according to a first embodiment of the present invention.
Figure 1B:
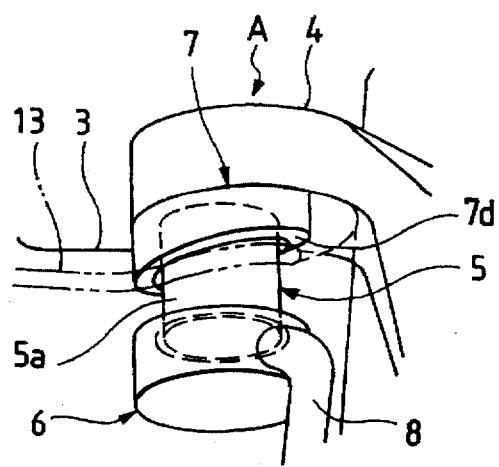
FIG. 1B is a partial enlarged side view of a spinning reel for fishing according to a first embodiment of the present invention.

Bail support members A, B are located on the outer sides of the leading end portions of a pair of bail support arms 2a, 2b of the rotor 2 and are also held reversibly and pivotally with a machine screw 11 in a fishline winding position as shown by a solid line of FIG. 1A and a fishline playing-out position as shown by a chain double-dashed line, respectively.

As shown in FIGS. 1 through 4, the bail support member A is formed with a rocking arm 4 and a line slider 6 for supporting a fishline guide roller 5. Moreover, an annular guide portion 7 is attached to the inner side of the rocking arm 4.

Figure 4:
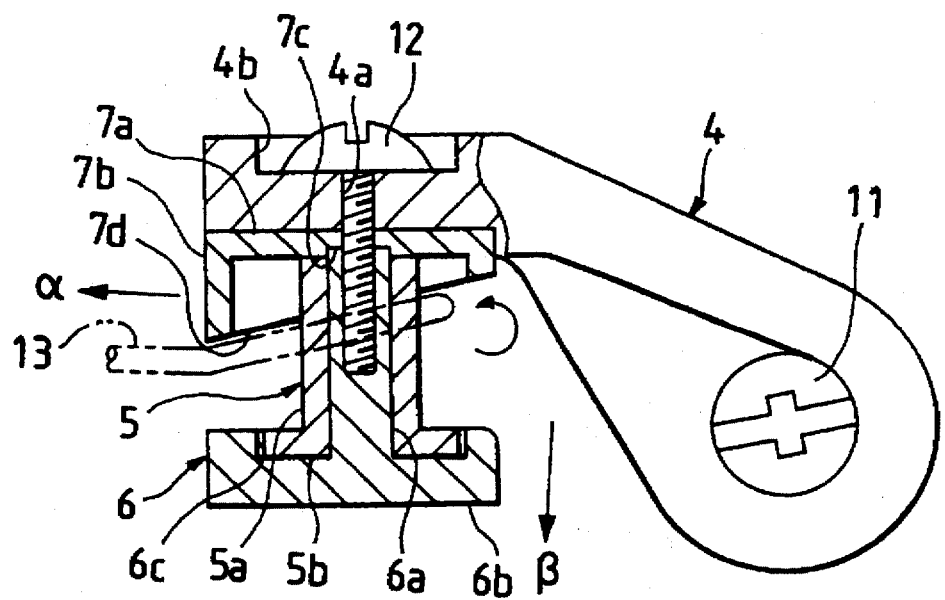
FIG. 4 is a sectional side view of the principal part of the bail support member on one side according to the first embodiment of the present invention.

Referring to FIG. 4, a through-hole 4a and an outside recessed portion 4b are formed in the rocking arm 4, and a bolt 12 inserted into the through-hole 4a is used to fasten a shaft portion 6a formed on the line slider 6.

The line slider 6 is formed with the shaft portion 6a, a collar portion 6b and a recessed portion 6c. The cylindrical fishline guide portion 5a of the fishline guide roller 5 for guiding a fishline 13 to the spool 3 is rotatably mated with the outer periphery of the shaft portion 6a. Further, the annular guide portion 7, for guiding the fishline 13 to the spool 3 is fixedly secured, along with the fishline guide roller 5, by, for example, press-fitting to the end of the shaft portion 6a.

The fishline guide roller 5 is formed with a cylindrical fishline guide portion 5a and a collar portion 5b, which is fitted into the recessed portion 6c of the line slider 6.

The annular guide portion 7 is dish-shaped with a bottom face 7a and a cylindrical portion 7b, and a recessed portion 7c is formed in the center of the bottom face 7a, the end of the shaft portion 6a being fitted by, for example, press-fitting into the recessed portion 7c. The cylindrical portion 7b of the annular guide portion 7 is situated outside the outer periphery of the fishline guide roller 5 and has a tilted face 7d in its end portion.

The tilted face 7d is oriented to contiguously guide the fishline 13, during the fishline winding operation, such that the fishline 13 arrives at a first position of the fishline guide roller 5 and departs from a second position of the fishline guide roller 5, the first position being downstream relative to the second position with respect to the rotational direction β in which the rotor is driven to wind the fishline. In other words, with the tilted face 7d of the annular guide portion 7, the fishline 13 is guided to depart from the fishline guide roller 5 at a position closer to the rocking arm 4 than a position where the fishline 13 begins to contact the fishline guide roller 5.

Figure 2A:
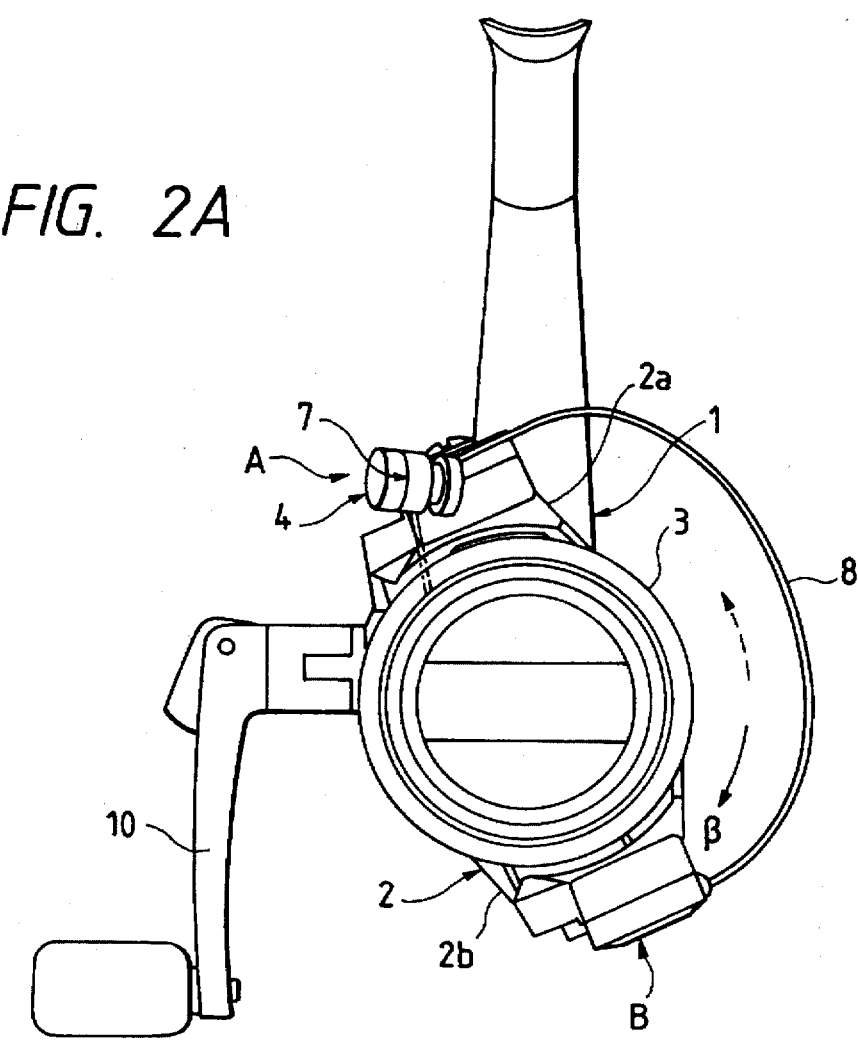
FIG. 2A is an elevational view of the above spinning reel for fishing according to the first embodiment of the present invention.
Figure 2B:
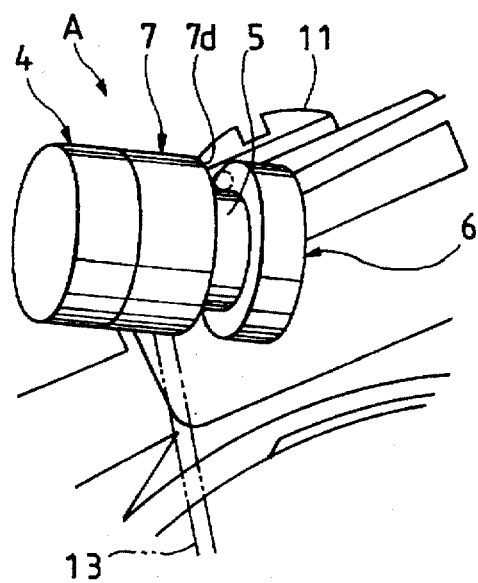
FIG. 2B is a partial enlarged elevational view of the above spinning reel for fishing according to the first embodiment of the present invention.
Figure 3:
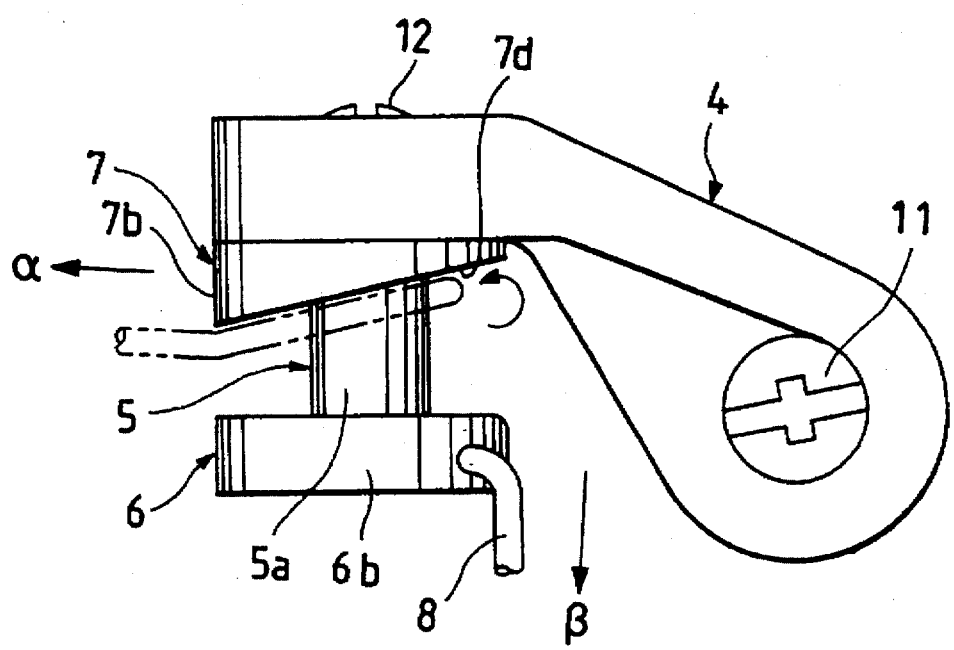
FIG. 3 is a side view of a bail support member on one side according to the first embodiment of the present invention.

The bail support member A is, in the fishline winding state of FIGS. 1A, 3, and 4, held in such a manner that the axes of the shaft portion 6a of the line slider 6 and the fishline guide roller 5 are tilted by, for example, 0°–10° toward the side of the bail support arm 2a with respect to a direction perpendicular to a direction α in which the fishline is played out, and also held slightly obliquely to the shaft center of the spool 3 as shown in FIG. 2.

A bail arm 8 is fitted to the collar portion 6b of the line slider 6 and to the other bail support member B.

Since the bail support member A is, in the fishline winding state, held in such a manner that the axes of the shaft portion 6a of the line slider 6 and the fishline guide roller 5 are tilted toward the side of the bail support arm 2a with respect to the direction α in which the fishline is played out as shown by an arrow of FIGS. 1A, 3, 4 during the operation of winding the fishline 13 as the rotor 2 is turned, the rotor 2 and the bail support member A are rotated clockwise as shown by β of FIG. 2A and in the fishline winding direction as shown by an arrow β of FIGS. 3, 4, when the fishline 13 is guided by the fishline guide roller 5 and the tilted face 7d of the annular guide portion 7 before being wound on the spool 3. While the fishline guide roller 5 is rotated because of the tension in the fishline 13, it is forced to shift toward the rocking arm 4, that is, in a direction opposite to the line slider 6. The guiding action of the tilted face 7d of the annular guide portion 7 then causes the fishline 13 to be wound on the spool 3 to become twisted in a direction opposite to the direction in which the fishline is played out without being affected by the fishline winding diameter.

Moreover, the fishline is prevented from becoming entangled because the annular guide portion 7 does not project from the rocking arm 4 and the line slider 6.

With the aforementioned spinning reel for fishing thus constructed, the fishline wound on the spool 3 is guided by the fishline guide roller 5 and the tilted face 7d of the annular guide portion 7 and while the fishline guide roller 5 is rotated because of the tension in the fishline 13, the guiding action of the tilted face 7d of the annular guide portion 7 then causes the fishline 13 to be wound on the spool 3 to become twisted in a direction opposite to the direction in which the fishline is played out without being affected by the fishline winding diameter. Thus, the twisting of the fishline 13 produced during the fishline winding operation and the twisting produced in the direction in which the fishline is played out are offset, preventing the accumulation of twisting, so that a smooth fishing operation can be performed.

Moreover, the annular guide portion 7 does not project from the rocking arm 4 and the line slider 6, ensuring that entanglement and severance of the fishline are prevented.

Figure 5A:
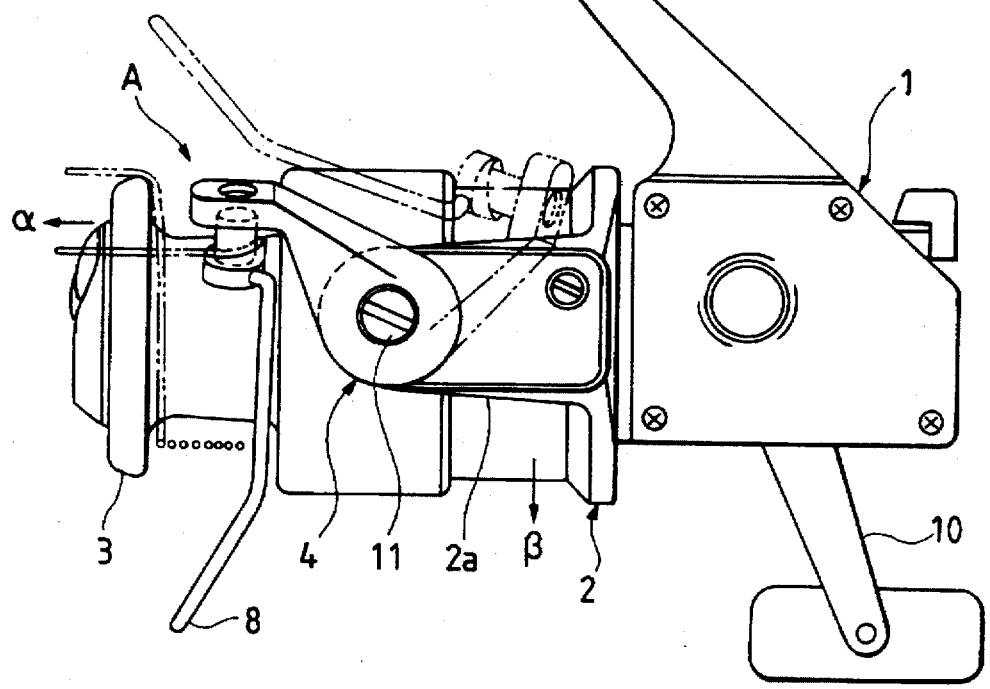
FIG. 5A is a side view of a spinning reel for fishing according to a second embodiment of the present invention.
Figure 5B:
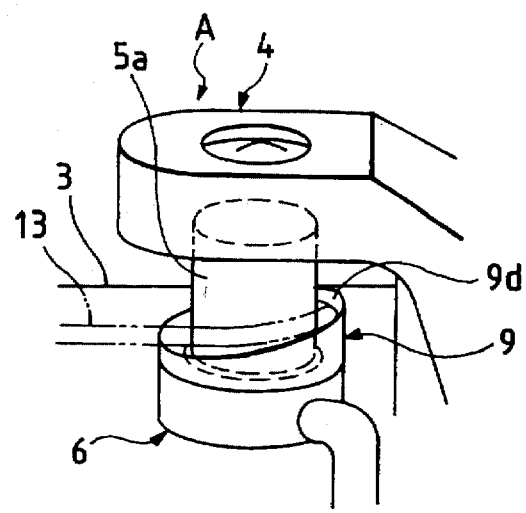
FIG. 5B is a partial enlarged side view of a spinning reel for fishing according to a second embodiment of the present invention.
Figure 6:
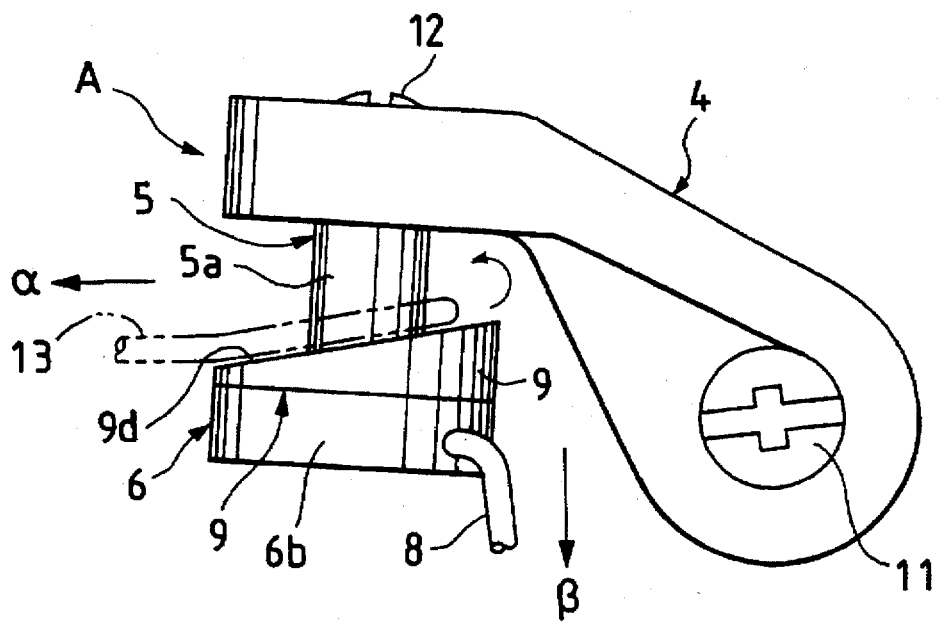
FIG. 6 is a side view of a bail support member on one side according to the second embodiment of the present invention.
Figure 7:
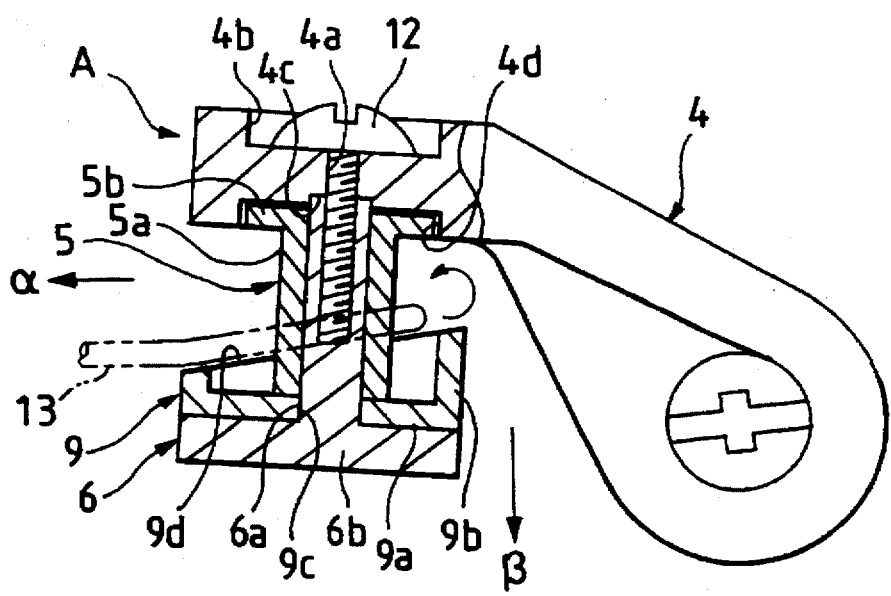
FIG. 7 is a sectional side view of the principal part of the bail support member on one side according to the second embodiment of the present invention.

FIGS. 5 through 7 refer to a second embodiment of the invention. According to the second embodiment of the invention, the bail support member A is formed with the rocking arm 4 and the line slider 6 for supporting the fishline guide roller 5. An annular guide portion 9 is fixedly attached to the inner side of the line slider 6.

Referring to FIG. 7, the through-hole 4a, the outside recessed portion 4b, and the inner-side recessed portions 4c, 4d are formed in the rocking arm 4. The shaft portion 6a formed on the line slider 6 is fitted into the recessed portion 4c. The bolt 12 inserted into the through-hole 4a is used to fasten the shaft portion 6a formed on the line slider 6.

The cylindrical fishline guide portion 5a of the fishline guide roller 5 for guiding the fishline 13 to the spool 3 is rotatably mated with the outer periphery of the shaft portion 6a of the line slider 6. Further, the annular guide portion 9 is fixedly secured by, for example, press-fitting to the outer periphery of the base of the shaft portion 6a.

The fishline guide roller 5 is formed with the cylindrical fishline guide portion 5a and the collar portion 5b, which is fitted into the recessed portion 4d of rocking arm 4.

The annular guide portion 9 is dish-shaped, with a bottom face 9a and a cylindrical portion 9b. A through-hole 9c is formed in the center of the bottom face 9a, the base of the shaft portion 6a being fitted by, for example, press-fitting into the through hole 9c. The cylindrical portion 9b is situated outside the outer periphery of the fishline guide roller 5 and provided with a tilted face 9d on its end portion.

The tilted face 9d is oriented to contiguously guide the fishline 13, during the fishline winding operation, such that the fishline 13 arrives at a first position of the fishline guide roller 5 and departs from a second position of the fishline guide roller 5, the first position being downstream relative to the second position with respect to the rotational direction β in which the rotor is driven to wind the fishline. In other words, with the tilted face 9d of the annular guide portion 9, the fishline 13 is guided to depart from the fishline guide roller 5 at a position closer to the rocking arm 4 than a position where the fishline 13 begins to contact the fishline guide roller 5.

The bail support member A is, in the fishline winding state of FIGS. 5 through 7, held in such a manner that the axes of the shaft portion 6a of the line slider 6 and the fishline guide roller 5 are tilted by, for example, 0°–10° toward the opposite side of the bail arm in the direction α in which the fishline is played out, and also held obliquely to the shaft center of the spool 3.

The remaining structure and functions of this embodiment are substantially similar to those of the first embodiment of the invention.

Since the bail support member A is, in the fishline winding state, held in such a manner that the axes of the shaft portion 6a of the line slider 6 and the fishline guide roller 5 are tilted toward the opposite side of the bail arm in the direction α in which the fishline is played out, as shown by the arrow of FIGS. 5 through 7, and also held obliquely to the shaft center of the spool 3 during the operation of winding the fishline 13 as the rotor 2 is turned, the rotor 2 and the bail support member A are rotated in the fishline winding direction as shown by the arrow β of FIGS. 5 through 7, when the fishline 13 is guided by the fishline guide roller 5 and the tilted face 9d of the annular guide portion 9 before being wound on the spool 3. While the fishline guide roller 5 is rotated because of the tension in the fishline 13, it is forced to shift toward the line slider 6. The guiding action of the tilted face 9d of the annular guide portion 9 then causes the fishline 13 to be wound on the spool 3 to become twisted in a direction opposite to the direction in which the fishline is played out without being affected by the fishline winding diameter.

Figure 8A:
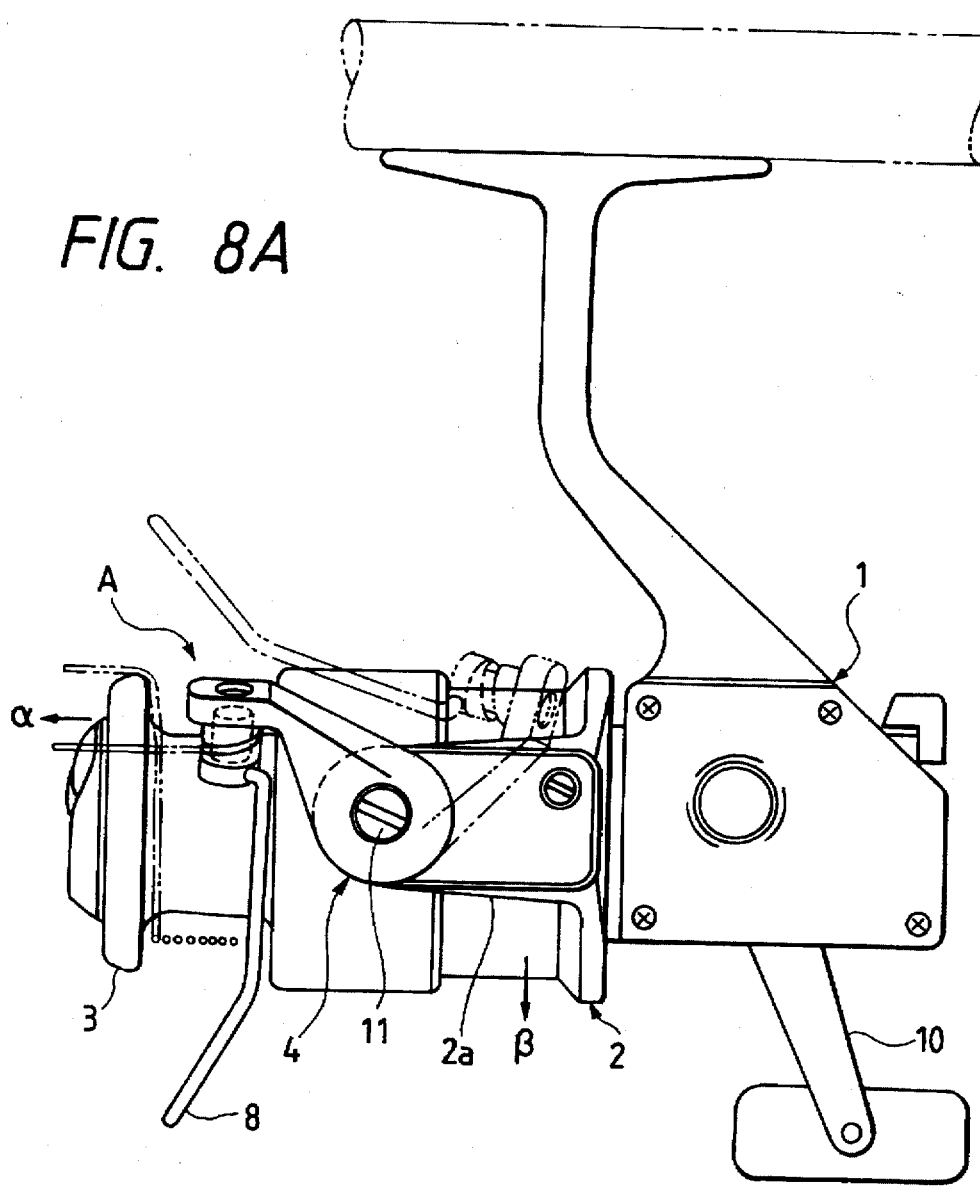
FIG. 8A is a side view of a spinning reel for fishing according to a third embodiment of the present invention.
Figure 8B:
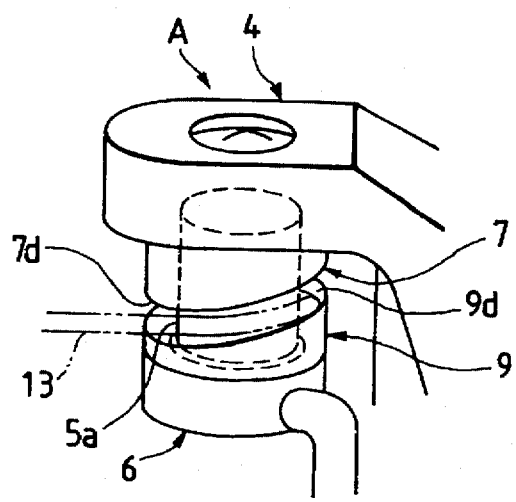
FIG. 8B is a partial enlarged side view of a spinning reel for fishing according to a third embodiment of the present invention.
Figure 9:
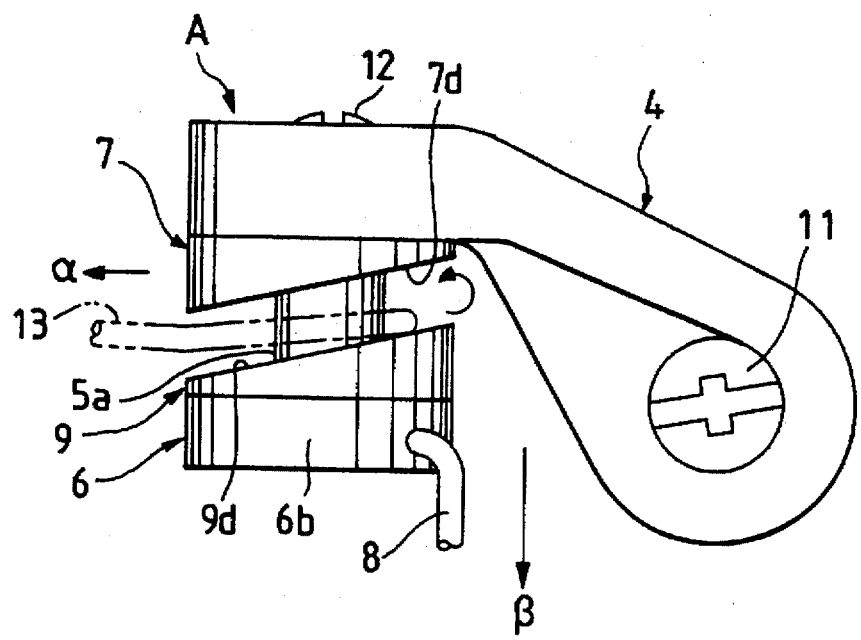
FIG. 9 is a side view of a bail support member on one side according to the third embodiment of the present invention.
Figure 10:
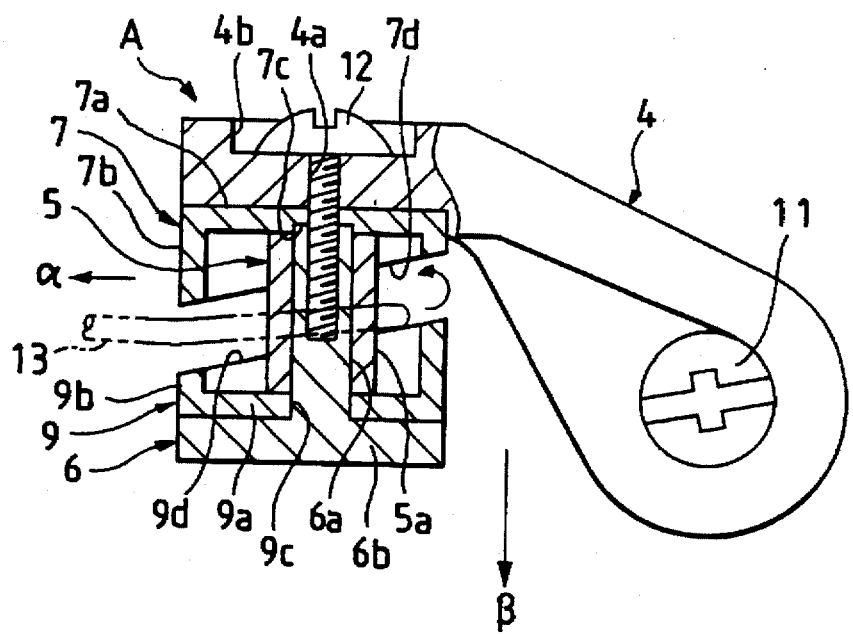
FIG. 10 is a sectional side view of the principal part of the bail support member on one side according to the third embodiment of the present invention.
Figure 11:
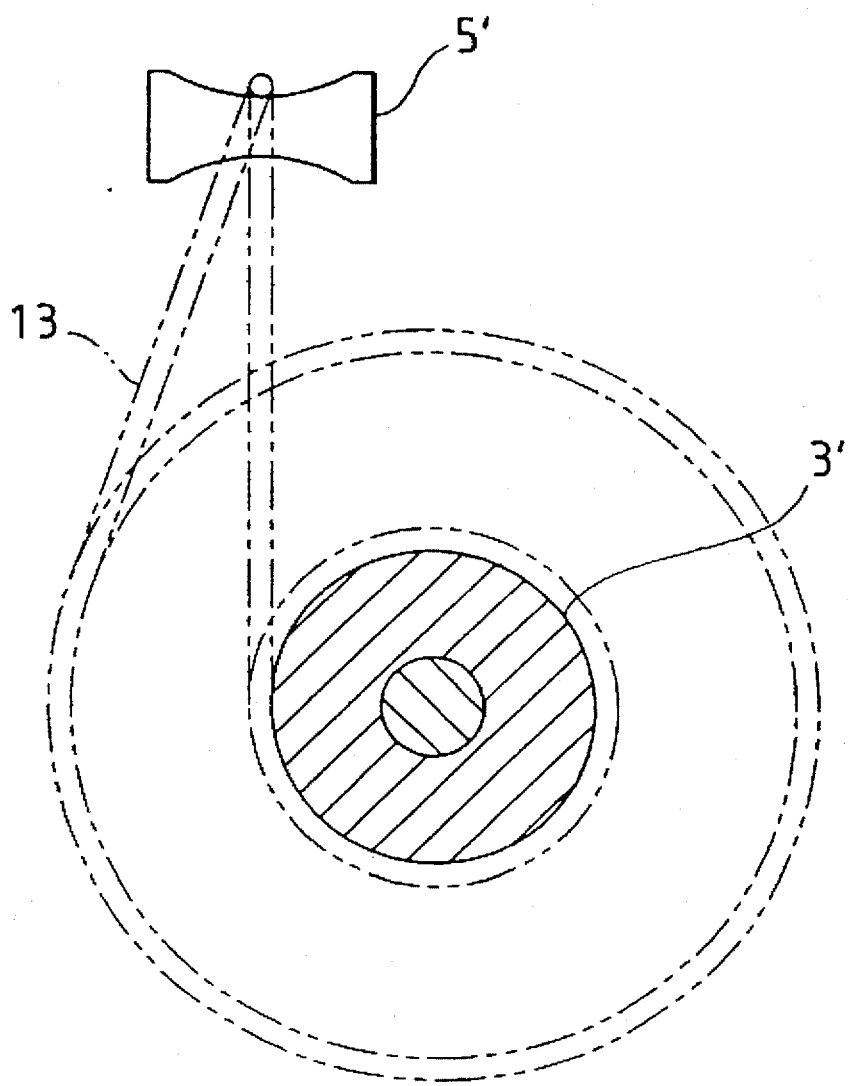
FIG. 11 is an elevational view illustrating a conventional fishline guide roller together with a conventional spool.

FIGS. 8 through 10 refer to a third embodiment of the invention. According to the third embodiment of the invention, the bail support member A is formed with the rocking arm 4 and the line slider 6 for supporting the fishline guide roller 5. Moreover, the annular guide portion 7 on one side is fixedly attached onto the inner side of the rocking arm 4, whereas the annular guide portion 9 on the other side is likewise attached onto the inner side of the line slider 6.

Referring to FIG. 10, the through-hole 4a and the outside recessed portion 4b are formed in the rocking arm 4, and the bolt 12 inserted into the through-hole 4a is used to fasten the shaft portion 6a formed on the line slider 6.

The cylindrical fishline guide portion 5a of the fishline guide roller 5 for guiding the fishline 13 to the spool 3 is rotatably mated with the outer periphery of the shaft portion 6a of the line slider 6. Further, the annular guide portions 7, 9 are fixedly secured by, for example, press-fitting to the outer periphery of the shaft portion 6a, with the cylindrical fishline guide portion 5a rotatably held therebetween.

The annular guide portion 7 is dish-shaped, with the bottom face 7a and the cylindrical portion 7b. The recessed portion 7c is formed in the center of the bottom face 7a, the end of the shaft portion 6a being fitted by, for example, press-fitting into the recessed portion 7c. The cylindrical portion 7b is situated outside the outer periphery of the fishline guide roller 5 and provided with the tilted face 7d in its end portion.

The annular guide portion 9 is dish-shaped, with the bottom face 9a and the cylindrical portion 9b. The through-hole 9c is formed in the center of the bottom face 9a, the base of the shaft portion 6a being fitted by, for example, press-fitting into the through hole 9c. The cylindrical portion 9b is situated outside the outer periphery of the fishline guide roller 5 and provided with the tilted face 9d in its end portion.

The space between the tilted faces 7d, 9d placed opposite to each other is set wider than the thickness of the fishline 13 to be used.

The bail support member A is, in the fishline winding state as shown in FIGS. 8 through 10, held in such a manner that the axes of the shaft portion 6a of the line slider 6 and the fishline guide roller 5 are held substantially perpendicular to the direction α in which the fishline is played out, and also held substantially parallel to the horizontal axis of the spool 3.

The remaining structure and functions of this embodiment are substantially similar to those of the first embodiment of the invention.

Since the bail support member A is, in the fishline winding state, held in such a manner that the axes of the shaft portion 6a of the line slider 6 and the fishline guide roller 5 are held substantially perpendicular to the direction α in which the fishline is played out, and also held substantially parallel to the horizontal axis of the spool 3 during fishline winding as the rotor 2 is turned, the rotor 2 and the bail support member A are rotated in the fishline winding direction as shown by the arrow β of FIGS. 9 and 10. At the same time, the fishline 13 is guided by the fishline guide roller 5, the tilted face 7d of the annular guide portion 7 and the tilted face 9d of the annular guide portion 9 before being wound on the spool 3. While the fishline guide roller 5 is rotated because of the tension in the fishline 13, the guiding action of the tilted face 7d of the annular guide portion 7 and the tilted face 9d of the annular guide portion 9 causes the fishline 13 to be wound on the spool 3 to become twisted in a direction opposite to the direction in which the fishline is played out, without being affected by the fishline winding diameter.

Although the fishline guide portion 5a of the fishline guide roller 5 has been described as having its outer periphery parallel to the center of the shaft portion 6a, it may also be made in a small-diameter, outer periphery-tapered form on the side of the rocking arm 4.

In the spinning reel according to the present invention as set forth above, the rotor and the bail support member are rotated in the fishline winding direction, and the fishline is guided by the tilted face of the annular guide portion (located on one or both sides of the annular guide portion) before being wound on the spool. While the fishline guide roller is rotated because of the tension in the fishline, the guiding action of the tilted face of the annular guide portion causes the fishline to be wound on the spool to become twisted in the direction opposite to the direction in which the fishline is played out, without being affected by the fishline winding diameter. Thus, the twisting of the fishline produced during the fishline winding operation and the twisting produced in the direction in which the fishline is played out are offset, with the effect of preventing the accumulation of twisting, so that a smooth fishing operation can be performed.

Since the annular guide portion does not project from the rocking arm and the line slider, it is possible to provide an excellent spinning reel for fishing which effectively prevents entanglement and severance of the fishline.

While specific embodiments of the invention have been described herein, it will be apparent to those of skill in the art that other modifications may be made within the scope of the invention, and it is intended that the full measure of the invention be determined with reference to the following claims:

What is claimed is:
1. A spinning reel for fishing, comprising:
    a spool;
    a handle;
    a rotor having a support arm and being rotatable in response to a rotation of said handle to wind a fishline around said spool;
    a support member disposed in a leading end portion of said support arm and having a rotatable fishline guide roller for guiding said fishline to said spool; and
    an annular guide portion provided on an outer periphery of said fishline guide roller,
    wherein said annular guide portion comprises a tilted face for guiding said fishline to said spool along with said fishline guide roller,
    wherein said tilted face is formed in an end portion of said annular guide portion,
    wherein said tilted face is oriented to guide said fishline during a fishline winding operation such that said fishline arrives at a first position of said fishline guide roller and departs from a second position of said fishline guide roller, and
    wherein said first position is downstream relative to said second position with respect to a rotational direction in which said rotor is rotated to wind said fishline.

2. A spinning reel for fishing as claimed in claim 1, wherein the support member comprises:
    a rocking arm operably connected to said support arm of said rotor; and
    a line slider connected to said rocking arm,
    wherein said is fishline guide roller is disposed between said rocking arm and said line slider and supported by at least one of said rocking arm and said line slider, and
    wherein said annular guide portion is disposed adjacent to said rocking arm.

3. A spinning reel for fishing as claimed in claim 2, wherein said tilted face faces away from said rocking arm.

4. A spinning reel for fishing as claimed in claim 2, wherein said fishline guide roller comprises a fishline guide roller axis which is tilted towards said support arm with respect to a reference axis which is perpendicular to a fishline playout direction.

5. A spinning reel for fishing as claimed in claim 4, wherein said fishline guide roller axis is tilted towards said support arm by 0 to 10 degrees with respect to said reference axis.

6. A spinning reel for fishing as claimed in claim 5, wherein said spool is disposed on a spool shaft having a spool shaft axis and wherein said fishline guide roller axis is obliquely disposed with respect to said spool shaft axis.

7. A spinning reel for fishing as claimed in claim 1, wherein the support member comprises:
    a rocking arm operably connected to said support arm of said rotor; and
    a line slider connected to said rocking arm,
    wherein said is fishline guide roller is disposed between said rocking arm and said line slider and supported by at least one of said rocking arm and said line slider, and
    wherein said annular guide portion is disposed adjacent to said line slider.

8. A spinning reel for fishing as claimed in claim 7, wherein said tilted face faces away from said line slider.

9. A spinning reel for fishing as claimed in claim 7, wherein said fishline guide roller comprises a fishline guide roller axis which is tilted away from said support arm with respect to a reference axis which is perpendicular to a fishline playout direction.

10. A spinning reel for fishing as claimed in claim 9, wherein said fishline guide roller axis is tilted away from said support arm by 0 to 10 degrees with respect to said reference axis.

11. A spinning reel for fishing as claimed in claim 10, wherein said spool is disposed on a spool shaft having a spool shaft axis and wherein said fishline guide roller axis is obliquely disposed with respect to said spool shaft axis.

12. A spinning reel for fishing as claimed in claim 1, wherein the support member comprises:
    a rocking arm operably connected to said support arm of said rotor; and
    a line slider connected to said rocking arm,
    wherein said is fishline guide roller is disposed between said rocking arm and said line slider and supported by at least one of said rocking arm and said line slider,
    wherein said annular guide portion comprises a first annular guide portion disposed adjacent to said rocking arm and a second annular guide portion disposed adjacent to said line slider, and
    wherein a gap is formed between said first and second annular guide portions and said fishline is guided along said fishline guide roller in said gap.

13. A spinning reel for fishing as claimed in claim 12, wherein said first annular guide portion comprises said tilted face, said tilted face faces away from said rocking arm, and said tilted face at least partially guides said fishline such that said fishline arrives at said first position and departs from said second position of said fishline guide roller.

14. A spinning reel for fishing as claimed in claim 13, wherein said second annular guide portion comprises a second tilted face which faces away from said line slider, wherein said gap is formed between said tilted face and said second tilted face, and wherein said tilted face and said second tilted face guide said fishline such that said fishline arrives at said first position and departs from said second position of said fishline guide roller.

15. A spinning reel for fishing as claimed in claim 14, wherein said fishline guide roller comprises a fishline guide roller axis which is substantially perpendicular to a fishline playout direction.

16. A spinning reel for fishing as claimed in claim 15, wherein said spool has a tangential axis and wherein said fishline guide roller axis is substantially parallel to said tangential axis.

17. A spinning reel for fishing as claimed in claim 12, wherein said fishline guide roller comprises a fishline guide roller axis which is substantially perpendicular to a fishline playout direction.

18. A spinning reel for fishing as claimed in claim 17, wherein said spool has a tangential axis and wherein said fishline guide roller axis is substantially parallel to said tangential axis.

19. A spinning reel for fishing as claimed in claim 12, wherein said second annular guide portion comprises said tilted face, said tilted face faces away from said line slider, and said tilted face at least partially guides said fishline such that said fishline arrives at said first position and departs from said second position of said fishline guide roller.

* * * * *